(12) United States Patent
Williams et al.

(10) Patent No.: US 10,672,301 B2
(45) Date of Patent: Jun. 2, 2020

(54) SYSTEMS AND METHODS FOR CONVERTING WEARABLE ORNAMENTS TO DISPLAYS

(71) Applicant: China Manufacturing Direct, Inc., Irvine, CA (US)

(72) Inventors: Daniel Williams, Mill Creek, WA (US); Amado Batour, Somerset, NJ (US); Erik Haldi, Mill Creek, WA (US)

(73) Assignee: China Manufacturing Direct, Inc., Irvine, CA (US)

( * ) Notice: Subject to any disclaimer, the term of this patent is extended or adjusted under 35 U.S.C. 154(b) by 0 days.

(21) Appl. No.: 15/436,441

(22) Filed: Feb. 17, 2017

(65) Prior Publication Data

US 2017/0318916 A1   Nov. 9, 2017

Related U.S. Application Data

(63) Continuation-in-part of application No. 29/570,329, filed on Jul. 7, 2016, now Pat. No. Des. 836,479, and a continuation-in-part of application No. 15/149,668, filed on May 9, 2016.

(51) Int. Cl.
| | |
|---|---|
| *A44C 1/00* | (2006.01) |
| *F16B 1/00* | (2006.01) |
| *G09F 3/20* | (2006.01) |
| *A45F 5/02* | (2006.01) |

(52) U.S. Cl.
CPC ................. *G09F 3/20* (2013.01); *A45F 5/02* (2013.01); *F16B 2001/0035* (2013.01)

(58) Field of Classification Search
CPC ......... A44C 1/00; A44B 17/0076; F16B 1/00; F16B 2001/0035
USPC .......... 24/13, 46, 55, 66.6, 89, 706.2, 706.4, 24/707.6, 707.7, 710.3, 303; 40/1.5, 1.6
See application file for complete search history.

(56) References Cited

U.S. PATENT DOCUMENTS

| | | | | |
|---|---|---|---|---|
| 1,183,392 A | * | 5/1916 | Meek ........................ | A44C 1/00 224/247 |
| 3,563,056 A | * | 2/1971 | Noel ....................... | A44C 7/003 63/12 |
| 3,630,048 A | * | 12/1971 | Masters .................. | A44C 7/003 24/108 |
| 3,735,447 A | * | 5/1973 | Abraham ................. | A44B 9/16 24/114.05 |
| 3,942,273 A | * | 3/1976 | Adams .................... | A44C 3/002 40/1.5 |
| 4,974,430 A | * | 12/1990 | Turner ..................... | A44C 7/00 24/304 |

(Continued)

*Primary Examiner* — Robert Sandy
*Assistant Examiner* — Rowland Do
(74) *Attorney, Agent, or Firm* — Puget Patent; Michael Gibbons

(57) ABSTRACT

A backing for an ornamental pin including a tab extended backwards at an angle. Said tab allows ornamental pin to become a display, and vice versa. Includes at least one hole configured to receive at least one type of pin back, including but not limited to needle style pins and locking pin mechanisms. Backing is substantially rigid to allow for standing function. Tab may be adjustable, but still fixable at an angle. Tab may be rigidly fixed at a particular angle. May include grip section for ease of use. Grip section may also enable the pin to lay more uniformly against a user's clothing when ornamental pin is used as such.

20 Claims, 5 Drawing Sheets

(56) References Cited

U.S. PATENT DOCUMENTS

| | | | | |
|---|---|---|---|---|
| 5,953,755 | A * | 9/1999 | Barylski | A41D 25/022 |
| | | | | 2/148 |
| 6,122,805 | A * | 9/2000 | Haegley | A44B 17/0082 |
| | | | | 24/114.05 |
| 6,257,021 | B1 * | 7/2001 | Hinton | A44C 7/003 |
| | | | | 24/705 |
| 6,367,126 | B1 * | 4/2002 | Rivkin | A45F 5/02 |
| | | | | 24/10 R |
| 7,966,755 | B1 * | 6/2011 | Reeves | G01C 17/04 |
| | | | | 24/303 |
| 8,114,100 | B2 * | 2/2012 | Smith | A61B 17/00234 |
| | | | | 24/706.4 |
| 2010/0310794 | A1 * | 12/2010 | Nordvik | B60R 13/00 |
| | | | | 428/31 |
| 2016/0149386 | A1 * | 5/2016 | Stechmann | H02G 3/32 |
| | | | | 248/68.1 |

* cited by examiner

SYSTEMS AND METHODS FOR CONVERTING WEARABLE ORNAMENTS TO DISPLAYS

PRIORITY CLAIM

This application claims priority from U.S. patent application Ser. No. 15/149,668, filed May 9, 2016 and to U.S. patent application Ser. No. 29/570,329, filed Jul. 7, 2016. The foregoing applications are hereby incorporated by reference in their entirety as if fully set forth herein.

FIELD OF THE INVENTION

This invention relates generally to jewelry, and, more specifically, to ornaments secured to the clothing by means of a pin attachment.

BACKGROUND OF THE INVENTION

Ornaments (figurines) configured to be attached to clothing by means of a pin attachment are often prized by their owners due to heirloom status or a particular affinity for the lifestyle, hobby, etc. which the ornament may represent. However, when the ornaments are not being worn, they are often stored out of sight in a jewelry box or other container, preventing their owners from enjoying them. Additionally, enthusiasts of many hobbies and lifestyles have figures and figurines on display at home or a workplace, but cannot easily enjoy these figurines outside the home. The present invention intends to remedy both problems by allowing individuals to easily display ornaments and figurines on a flat surface or on an article of clothing with a single mechanism.

SUMMARY OF THE INVENTION

This invention relates generally to jewelry, and, more specifically, to ornaments secured to the clothing by means of a pin attachment.

The invention disclosed herein is a substantially rigid backing configured to removably couple with figurines, enamel pins, collector pins, lapel pins, etc. It should be noted that, wherever the word "figurine" appears throughout this specification, that it is intended to include figurines, enamel pins, collector pins, lapel pins, etc. without limitation or waiver. In some embodiments, the backing may include a substantially vertical section and a stand section, the stand section disposed at an angle to the vertical section. When coupled with a figurine, the stand section and the base of the figurine allow the figurine to stand vertically for display. The backing may include one or more holes for receiving the pin of a figurine or ornamental pin. The figurine may include a handle or grip section to allow for easy coupling with and removal from the figurine. The grip section may also cause the figurine to lie more uniformly against a user's clothing when worn on the user's person as an ornamental pin.

BRIEF DESCRIPTION OF THE DRAWINGS

Certain embodiments of the present invention are described in detail below with reference to the following drawings.

DETAILED DESCRIPTION

This invention relates generally to jewelry, and, more specifically, to ornaments secured to the clothing by means of a pin attachment.

Specific details of certain embodiments of the invention are set forth in the following description and in FIGS. 1-4 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
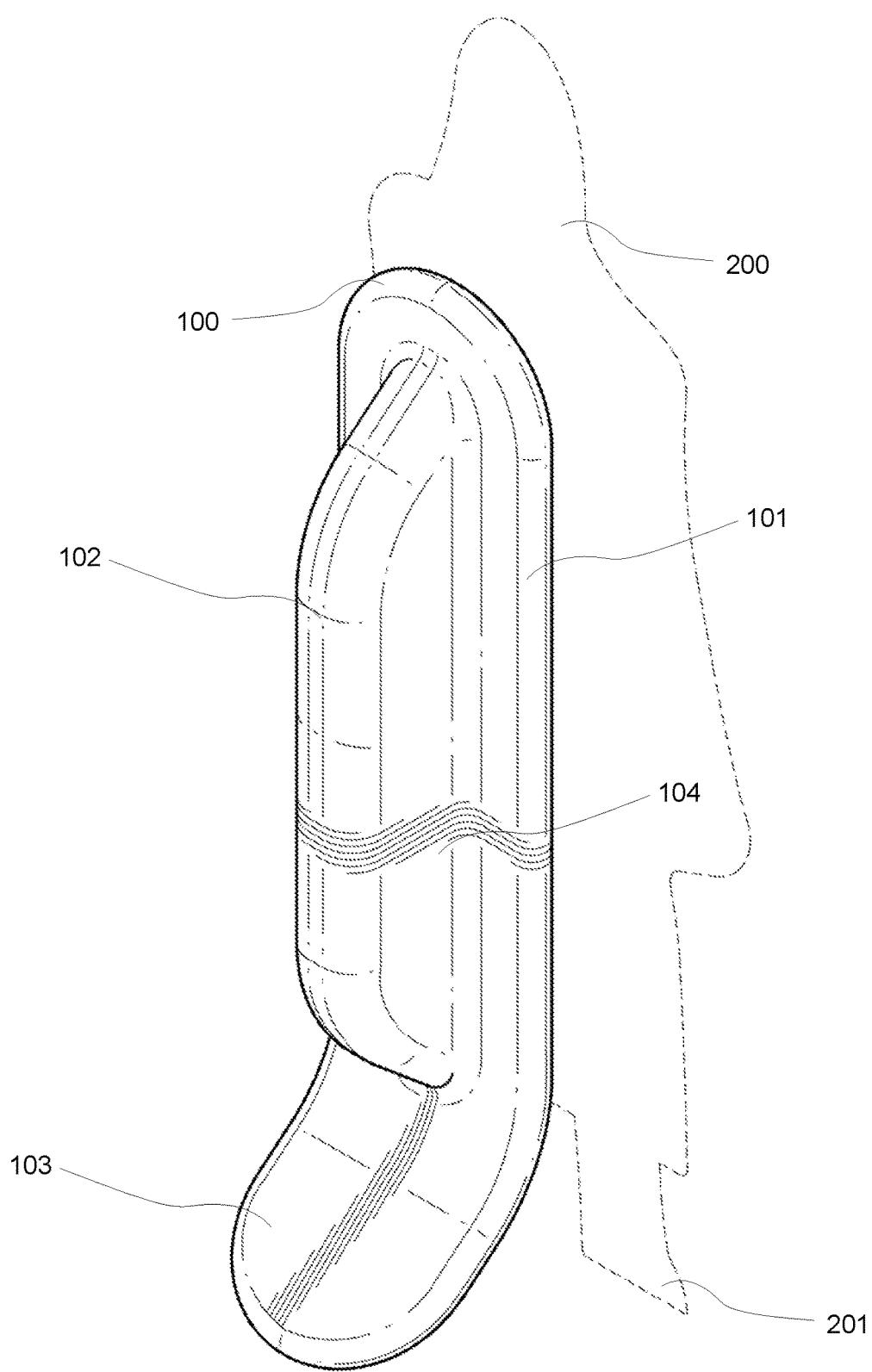
FIG. 1 is an isometric environmental view of one embodiment of the figpin.

FIG. 1 is an isometric environmental view of one embodiment of the figpin 100 as it is removably coupled with a figurine 200. The figpin 100 is comprised essentially of a backing 101 and a tab 103. The figpin 100 is designed to act as both a pin backing and a figurine stand. Tab 103 is disposed at an angle to backing 101. When coupled with a figurine 200, tab 103 and figurine base 201 create a support, allowing the figurine to stand vertically or substantially vertically on a flat surface.

In preferred embodiments, figpin 100 includes a handle 102. Often the handle 102 will be disposed between the tab 103 and the top of the figpin 100, but in some embodiments it may be disposed on the top or the bottom of the figpin. In some embodiments, the handle 102 may be substantially solid such that a user can grasp a grip area 104 to dislodge the figpin 100 from a figurine 200. In other embodiments, handle 102 may be hollow. The handle 102 will generally be coupled with the rear of the figpin 100, though it may be disposed on a side of the figpin. When disposed on the rear of figpin 100, the handle 102 may additionally serve to allow the figurine 200 to lie more uniformly against a user's clothing. In some embodiments, handle 102 may be replaced by a decoupling mechanism, such as a button and spring, that, when activated, dislodges the figpin 100 from the figurine 200 (see FIG. 1). Handle 102 may, in some embodiments, be permanently coupled to figpin 100, such as by weld, adhesive, or by virtue of the figpin being comprised of a single unit. In other embodiments, handle 102 may be removably coupled with the figpin 100. Such an embodiment may serve to, inter alia, allow a figurine to lie flatter against a user's clothing.

Figure 2:
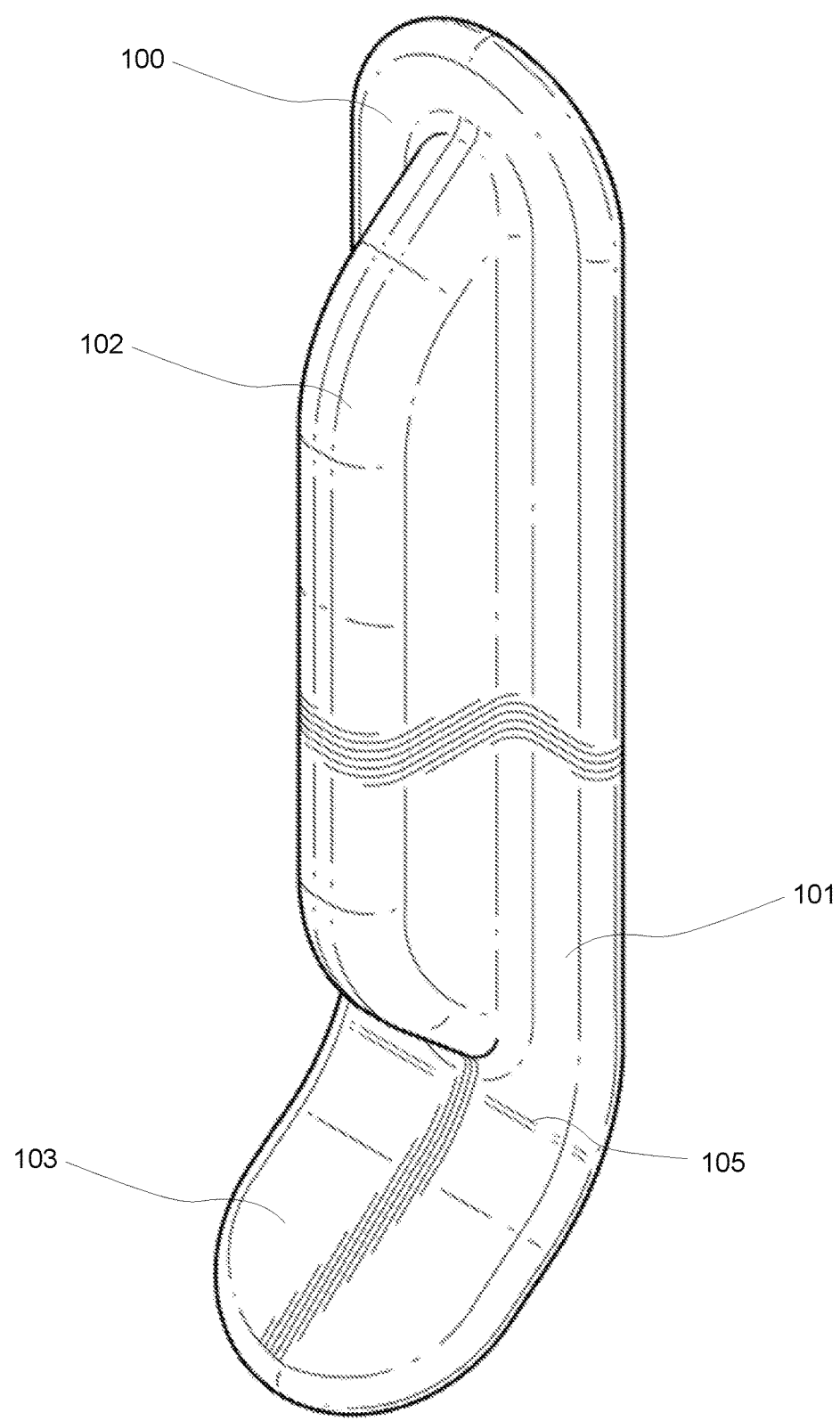
FIG. 2 is an isometric rear view of a different embodiment of the figpin.

FIG. 2 is a rear isometric view of an alternative embodiment of the figpin 100. Figpin 100 will generally be a rigid or substantially rigid device, comprised of materials such as plastics, hard rubbers, wood, or metal. Moreover, figpin 100 may be comprised of a single piece, such that base 101, handle 102, and tab 103 are permanently positioned relative to each other. For example, figpin 100 may be die cast or extrusion molded as a solitary unit. However, in some embodiments, figpin 100 may include a hinge point 105 about which tab 103 can rotate in relation to base 101. In some embodiments, hinge point 105 may be simply comprised of a pin and hole configuration, wherein the pin serves both to couple tab 103 with base 101 and to provide a point of rotation. In more complex embodiments, hinge point 105 may be comprised of a different, more flexible material coupled with tab 103 and base 101. It may be a ratchet mechanism, a spring mechanism, a more flexible material disposed over a conformable material such as wiring, and so on. In some embodiments, tab 103 may be entirely removable from base 101. In such embodiments, tab 103 would become positionable, allowing a user to decide at what angle the tab will be in relation to base 101. This would allow a user to cause tab 103 to be substantially flush with base 101 in some uses, or to change the angle of display with the figurine is on a surface. It may also allow a user to display the figurine on a surface that is not entirely horizontal, by increasing the angle at which the figurine is disposed relative to the surface.

Figure 3A:
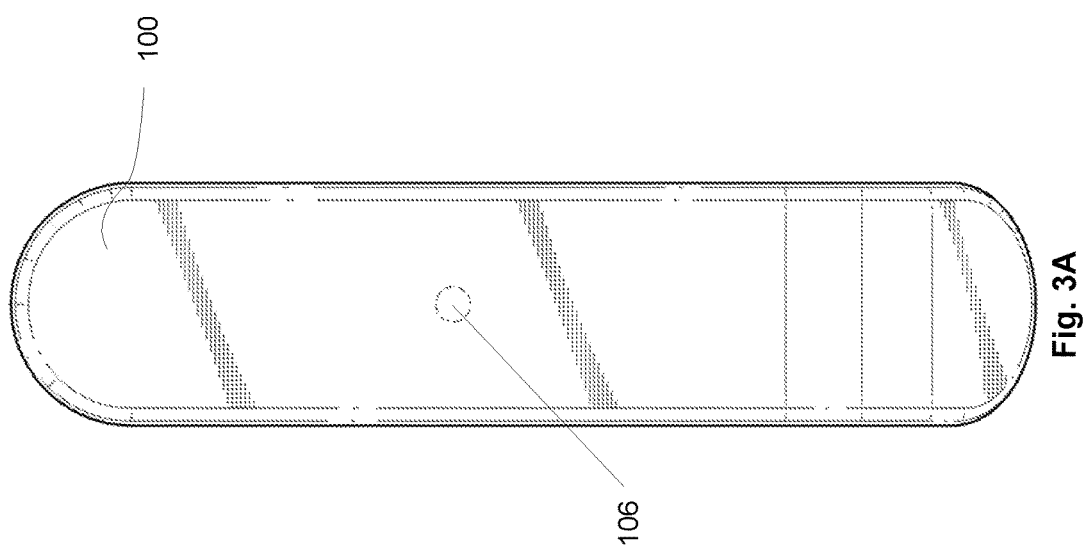
FIG. 3A is a front view of a different embodiment of the figpin.
Figure 3:
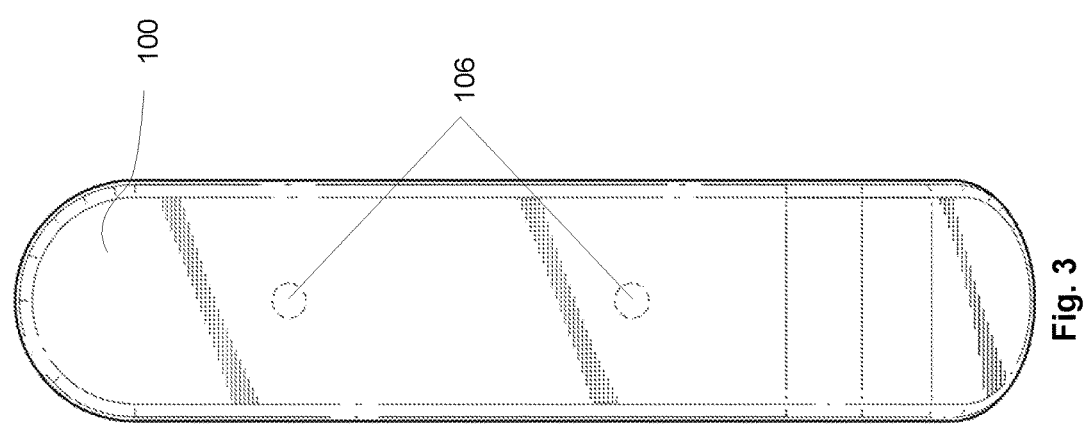
FIG. 3 is a front view of one embodiment of the figpin.

FIG. 3 is a front view of one embodiment of the figpin 100. In this embodiment, the figpin 100 includes two holes 106. This allows a user to secure the figpin 100 to a figurine at two points, increasing the security of the grip. Additionally, using two holes 106 prevents the needle of the pin from bending under the weight of the figurine. Finally, two holes 106 may allow the figpin 100 to be used with ornaments containing a locking pin back rather than a needle disposed perpendicularly to the rear of the ornament. However, some ornaments and figurines may not have an additional needle, and FIG. 3A is a front view of an alternative embodiment of the figpin 100, in which only a single hole 106 is present. This allows the stand device to be used with existing ornaments and pins that have only a single, short needle.

Figure 4A:
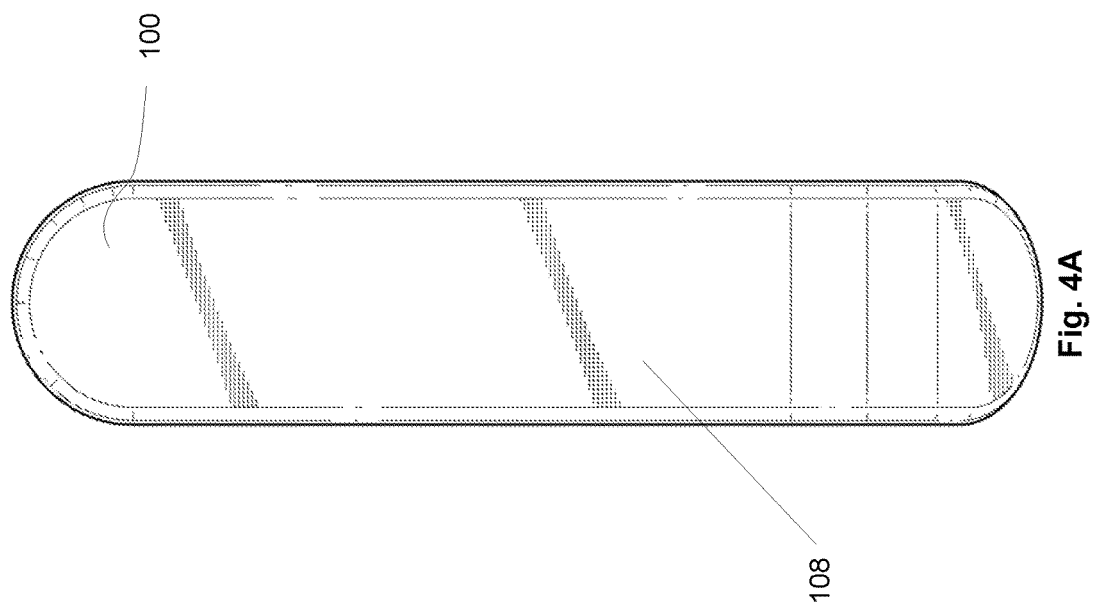
FIG. 4A is a front view of another embodiment of the figpin.
Figure 4:
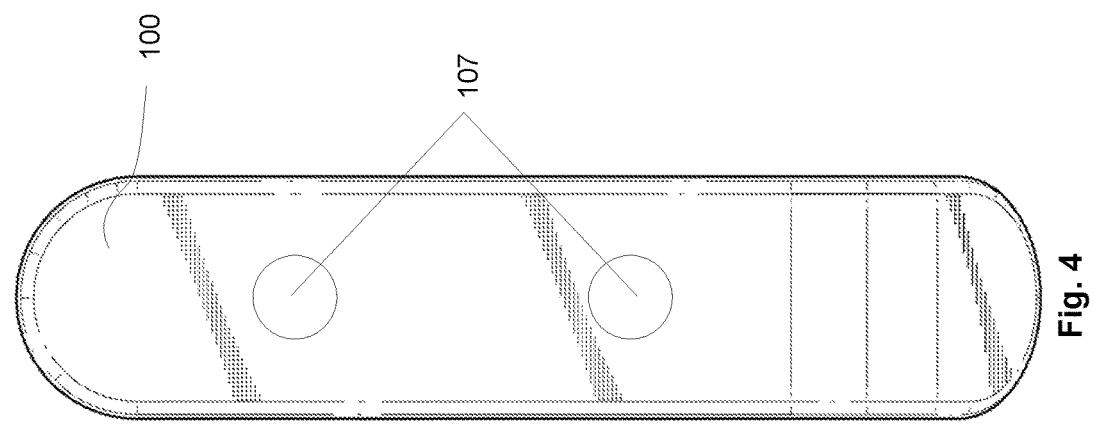
FIG. 4 is a front view of another embodiment of the figpin.

In an alternative embodiment, the figpin 100 may magnetically couple with the wearable ornament. In this embodiment, the figpin 100 may include two or more first magnets 107 or a ferrous metal plate 108, as seen in FIGS. 4 and 4A, respectively. In a magnetic embodiment, the wearable ornament may include two or more second magnets or a ferrous metal plate, wherein the magnets are coupled with the wearable ornament in such a way that they magnetically interact with the magnets on the figpin. This allows a user to secure the figpin 100 to a figurine at two or more points, increasing the security of the grip. Using two or more first magnets 107 may prevent the ornament from sliding or falling off under the weight of the figurine. Additionally, corresponding magnets on the figpin 100 and the wearable ornament can be configured such that the figpin couples with the ornament in a predetermined orientation, the orientation controlled by changing the polarity of the ornaments. It should be understood that magnets exert magnetic forces on materials that are not permanently magnetized. Therefore, it should be understood that wherever a magnet is contemplated, so is a magnetically reactive material. So long as at least one of the figpin or the ornament is coupled with a magnet, and the other is coupled with a ferromagnetic material, the function of the magnetic figpin will be substantially unchanged.

Figure 5:
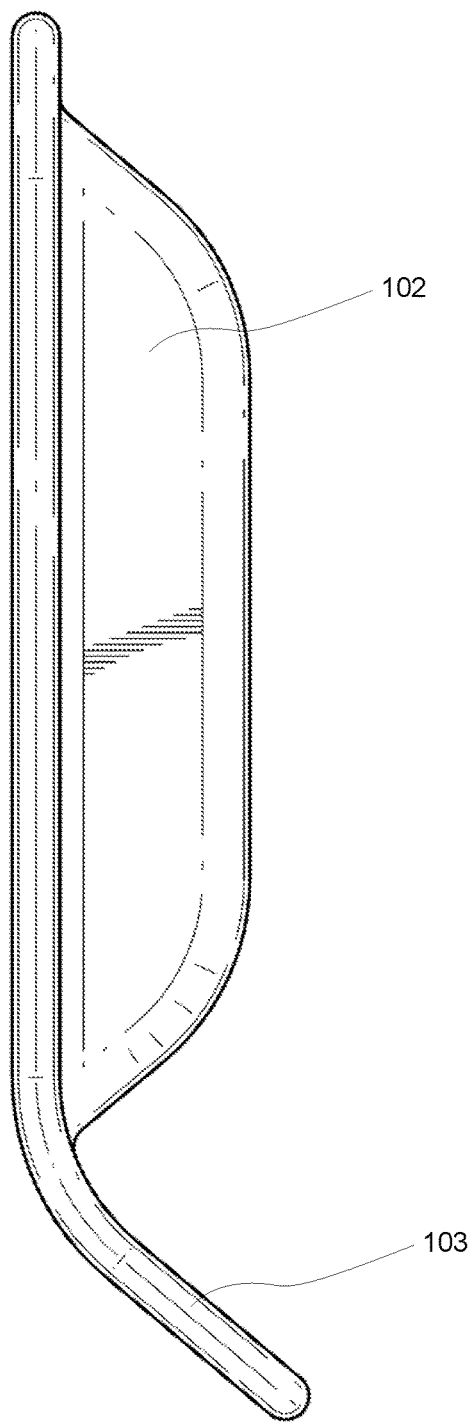
FIG. 5 is a side view of one embodiment of the figpin.
Figure 6:
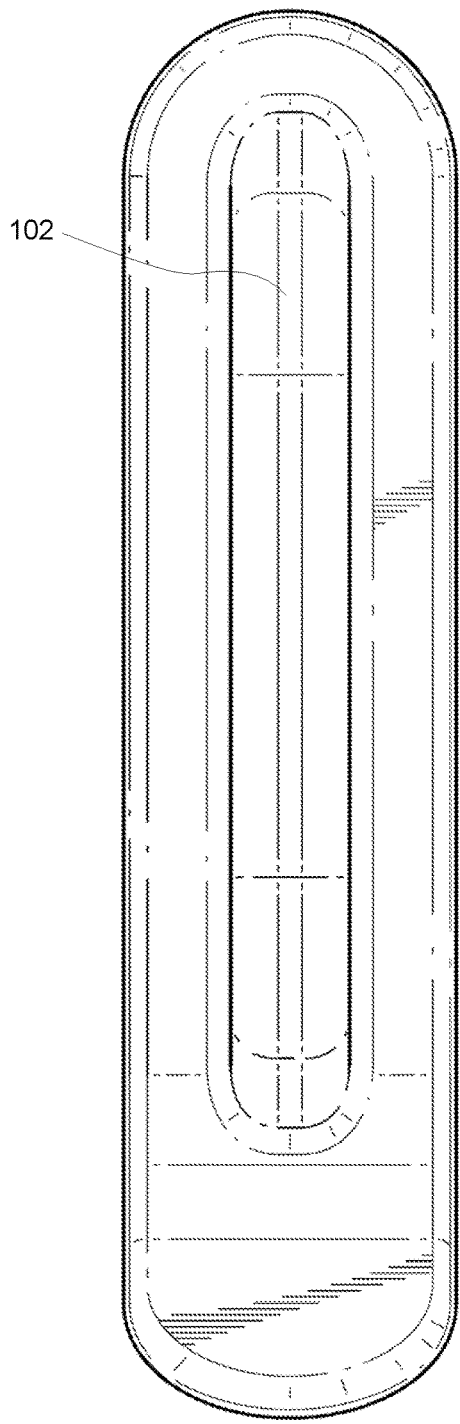
FIG. 6 is a front view of one embodiment of the figpin.

FIG. 5 is a side view of one embodiment of the figpin 100. Here it can be seen that, in some embodiments, handle 102 and tab 103 terminate at a length that is substantially coplanar. FIG. 6 is a front view of one embodiment of the figpin 100. In some embodiments, handle 102 may have solid sides, as shown in FIG. 5, but it may be hollow internally, as shown in FIG. 6. Such embodiments may allow a user to grip the figpin 100 very well without adding additional weight. However, as above, in some embodiments handle 102 may be entirely hollow, such as a ring or loop, or entirely solid, without impacting the functionality of handle 102.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A figurine display system, comprising:
   a figurine, the figurine including at least:
     an ornament side;
     a back side, the back side opposite to the ornament side;
     a figurine base;
     a figurine top, the figurine top opposite to the figurine base;
     a bottom figurine magnet, the bottom figurine magnet coupled to the back side; and
     a top figurine magnet, the top figurine magnet coupled to the back side, the bottom figurine magnet and top figurine magnet disposed vertically between the figurine base and the figurine top; and
   a stand, the stand including at least:
     a front side;
     a rear side;
     a handle coupled perpendicularly to the rear side of the stand;
     a tab, the tab disposed at a bottom end of the stand and at an angle directing the tab away from the front side of the stand;
     a bottom stand magnet, the bottom stand magnet coupled to the front side in a position corresponding to the bottom figurine magnet; and
     a top stand magnet, the top stand magnet coupled to the front side in a position corresponding to the top figurine magnet, the bottom stand magnet and the top stand magnet disposed vertically between the tab and a top end of the stand, the bottom stand magnet and the top stand magnet coupled with the front side of the stand in an orientation providing a magnetic polarity opposite to a magnetic polarity of the bottom figurine magnet and top figurine magnet upon the figurine and the stand being brought together with the front side of the stand adjacent to the back side of the figurine and the bottom end of the stand proximate to the figurine base.

2. The figurine display system of claim 1, wherein the handle coupled perpendicularly to the rear side of the stand includes at least a first grip portion disposed on one side of the handle and at least a second grip portion disposed on an opposing side of the handle from the at least the first grip portion.

3. The figurine display system of claim 2, wherein the at least the first grip portion and the at least the second grip portion are configured to permit a user to grasp the stand to dislodge the stand, when coupled to the figurine, from the figurine.

4. The figurine display system of claim 2, wherein the at least the first grip portion and the at least the second grip portion are substantially hollow.

5. The figurine display system of claim 2, wherein the at least the first grip portion and the at least the second grip portion are defined by hollowed out portions on either side of the handle, the hollowed out portions on either side of the handle enabling a user to place a thumb and a fingertip inside the hollowed out portions to grasp the stand to dislodge the stand, when coupled to the figurine, from the figurine.

6. The figurine display system of claim 1, wherein the tab is rigidly coupled with the stand such that the angle at which the tab is disposed relative to the stand is fixed.

7. The figurine display system of claim 1, wherein the tab is flexibly coupled with the stand such that the angle at which the tab is disposed relative to the stand is adjustable.

8. The figurine display system of claim 1, wherein the tab and the handle are molded as a solitary unit.

9. The figurine display system of claim 1, wherein the top stand magnet is disposed such that a magnetic polarity of the top stand magnet is in line with a magnetic polarity of the bottom stand magnet.

10. The figurine display system of claim 1, wherein the tab disposed at the bottom end of the stand is disposed at an angle directing the tab toward the rear side of the stand.

11. The figurine display system of claim 1, wherein the handle coupled perpendicularly to the rear side of the stand is disposed vertically between the tab and the top end of the stand.

12. The figurine display system of claim 1, wherein the angle at which the tab is disposed relative to the stand is configured to enable the stand, when coupled with the figurine, to allow the figurine to stand vertically for display.

13. The figurine display system of claim 1, wherein the top stand magnet is disposed such that a magnetic polarity of the top stand magnet is oriented opposite to a magnetic polarity of the bottom stand magnet.

14. The figurine display system of claim 1, wherein a bottom end of the tab and a top end of the stand are rounded.

15. The figurine display system of claim 1, wherein the stand is a figurine stand.

16. The figurine display system of claim 1, wherein the stand is a figpin.

17. The figurine display system of claim 1, wherein the stand is a pin backing.

18. The figurine display system of claim 1, wherein the tab of the stand and a figurine base of the figurine provide a support for the figurine allowing the figurine to stand at least one of vertically or substantially vertically on a surface, the surface being other than the figurine or the stand.

19. A figurine stand, consisting of:
    a backing, the backing including a top end and a bottom end;
    a handle coupled perpendicularly to a rear side of the backing and disposed vertically between the top end and the bottom end of the backing;
    a tab coupled with the bottom end of the backing, the tab disposed such that a plane through the tab intersects a plane through the backing at an angle directing the tab away from a front side of the backing,
    wherein the backing, the tab, and the handle are molded as a solitary unit;
    a first magnet coupled to the front side of the backing; and
    a second magnet coupled to the front side of the backing, the first magnet and the second magnet disposed vertically between the top end of the backing and the bottom end of the backing.

20. A figurine stand, comprising:
- a backing, the backing including a top end and a bottom end;
- a handle coupled perpendicularly to a rear side of the backing and disposed vertically between the top end of the backing and the bottom end of the backing;
- a tab coupled with the bottom end of the backing, the tab disposed such that a plane through the tab intersects a plane through the backing at an angle directing the tab away from a front side of the backing,
- wherein the backing, the tab, and the handle are molded as a solitary unit;
- a first magnet coupled to the front side of the backing; and
- a second magnet coupled to the front side of the backing, the first magnet and the second magnet disposed vertically between the top end of the backing and the bottom end of the backing, the first magnet and the second magnet coupled with the front side of the backing in an orientation providing a magnetic polarity that magnetically attracts two corresponding magnets coupled with a figurine in an orientation allowing the figurine to stand upright for display when magnetically coupled to the figurine stand.

* * * * *